United States Patent
Ito

(10) Patent No.: US 12,294,322 B2
(45) Date of Patent: May 6, 2025

(54) DRIVE SYSTEM AND CONTROL METHOD

(71) Applicant: TOSHIBA MITSUBISHI-ELECTRIC INDUSTRIAL SYSTEMS CORPORATION, Tokyo (JP)

(72) Inventor: Takumi Ito, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 18/259,427

(22) PCT Filed: Oct. 29, 2021

(86) PCT No.: PCT/JP2021/040116
§ 371 (c)(1),
(2) Date: Jun. 27, 2023

(87) PCT Pub. No.: WO2023/073953
PCT Pub. Date: May 4, 2023

(65) Prior Publication Data
US 2024/0120865 A1 Apr. 11, 2024

(51) Int. Cl.
*H02P 21/18* (2016.01)
*H02P 21/00* (2016.01)
(Continued)

(52) U.S. Cl.
CPC .......... *H02P 21/18* (2016.02); *H02P 21/0003* (2013.01); *H02P 21/34* (2016.02); *H02P 27/06* (2013.01); *H02P 2207/05* (2013.01)

(58) Field of Classification Search
CPC ...... H02P 21/18; H02P 21/0003; H02P 21/34; H02P 27/06
See application file for complete search history.

(56) References Cited

U.S. PATENT DOCUMENTS 7,960,930 B2 * 6/2011 Sato ............... B60L 15/025
318/599
9,991,828 B2 * 6/2018 Kawahata .......... G03G 21/14
(Continued)

FOREIGN PATENT DOCUMENTS

JP 2009-27799 A 2/2009

*Primary Examiner* — Thai T Dinh
(74) *Attorney, Agent, or Firm* — Oblon, McClelland, Maier & Neustadt, L.L.P.

(57) ABSTRACT

A drive system according to an aspect of the embodiment includes a first phase estimation unit, a second phase estimation unit, a state determination unit, and a drive control unit. The first phase estimation unit generates a first phase obtained by estimating a phase of a rotor on the basis of an initial phase at a startup stage of the synchronous motor. The second phase estimation unit generates a second phase obtained by estimating the phase of the rotating rotor on the basis of the operation state of the synchronous motor. The state determination unit determines the operation state of the synchronous motor. The drive control unit controls the driving of the synchronous motor by using any one of the first phase and the second phase according to the determination result of the operation state of the synchronous motor. The first phase estimation unit corrects the first phase by using the detection result of the rotor position detected from the start of the startup procedure of the synchronous motor to the successful startup.

8 Claims, 10 Drawing Sheets

(51) Int. Cl.
*H02P 21/34* (2016.01)
*H02P 27/06* (2006.01)

(56) References Cited

U.S. PATENT DOCUMENTS

| | | | |
|---|---|---|---|
| 11,228,270 B2* | 1/2022 | Kinjo | H02P 27/06 |
| 11,336,218 B1* | 5/2022 | Tzeng | H02P 6/182 |
| 11,489,480 B2* | 11/2022 | Lee | H02P 29/028 |

* cited by examiner

| No | PID | θP | | PCID | θPC |
|---|---|---|---|---|---|
| 1 | P1 | θPC1 | ±α | PC1 | θPC1 |
| 2 | P2 | θPC2 | ±α | PC2 | θPC2 |
| 3 | P3 | θPC3 | ±α | PC3 | θPC3 |
| 4 | P4 | θPC4 | ±α | PC4 | θPC4 |
| 5 | P5 | θPC5 | ±α | PC5 | θPC5 |
| 6 | P6 | θPC6 | ±α | PC6 | θPC6 |

DRIVE SYSTEM AND CONTROL METHOD

TECHNICAL FIELD

Embodiments of the present invention relate to a drive system and a control method.

BACKGROUND ART

In a drive system capable of controlling a speed of an excitation type synchronous motor (hereinafter, simply referred to as a synchronous motor), it may be difficult to estimate a phase and a speed in a low speed range when the synchronous motor is stopped and started and it was required to prevent the synchronous motor from stalling or stepping out in the control of the low speed range at startup.

CITATION LIST

Patent Document

[Patent Document 1]
Japanese Unexamined Patent Application, First Publication No. 2009-27799

SUMMARY OF INVENTION

Technical Problem

The problem to be solved by the present invention is to provide a drive system and a control method capable of starting a synchronous motor without stalling.

Solution to Problem

A drive system according to an aspect of the embodiment includes a first phase estimation unit, a second phase estimation unit, a state determination unit, and a drive control unit. The first phase estimation unit generates a first phase obtained by estimating a phase of a rotor on the basis of an initial phase at a startup stage of the synchronous motor. The second phase estimation unit generates a second phase obtained by estimating the phase of the rotating rotor on the basis of the operation state of the synchronous motor. The state determination unit determines the operation state of the synchronous motor. The drive control unit controls the driving of the synchronous motor by using any one of the first phase and the second phase according to the determination result of the operation state of the synchronous motor. The first phase estimation unit corrects the first phase by using the detection result of the rotor position detected from the start of the startup procedure of the synchronous motor to the successful startup.

DESCRIPTION OF EMBODIMENTS

Figure 1A:
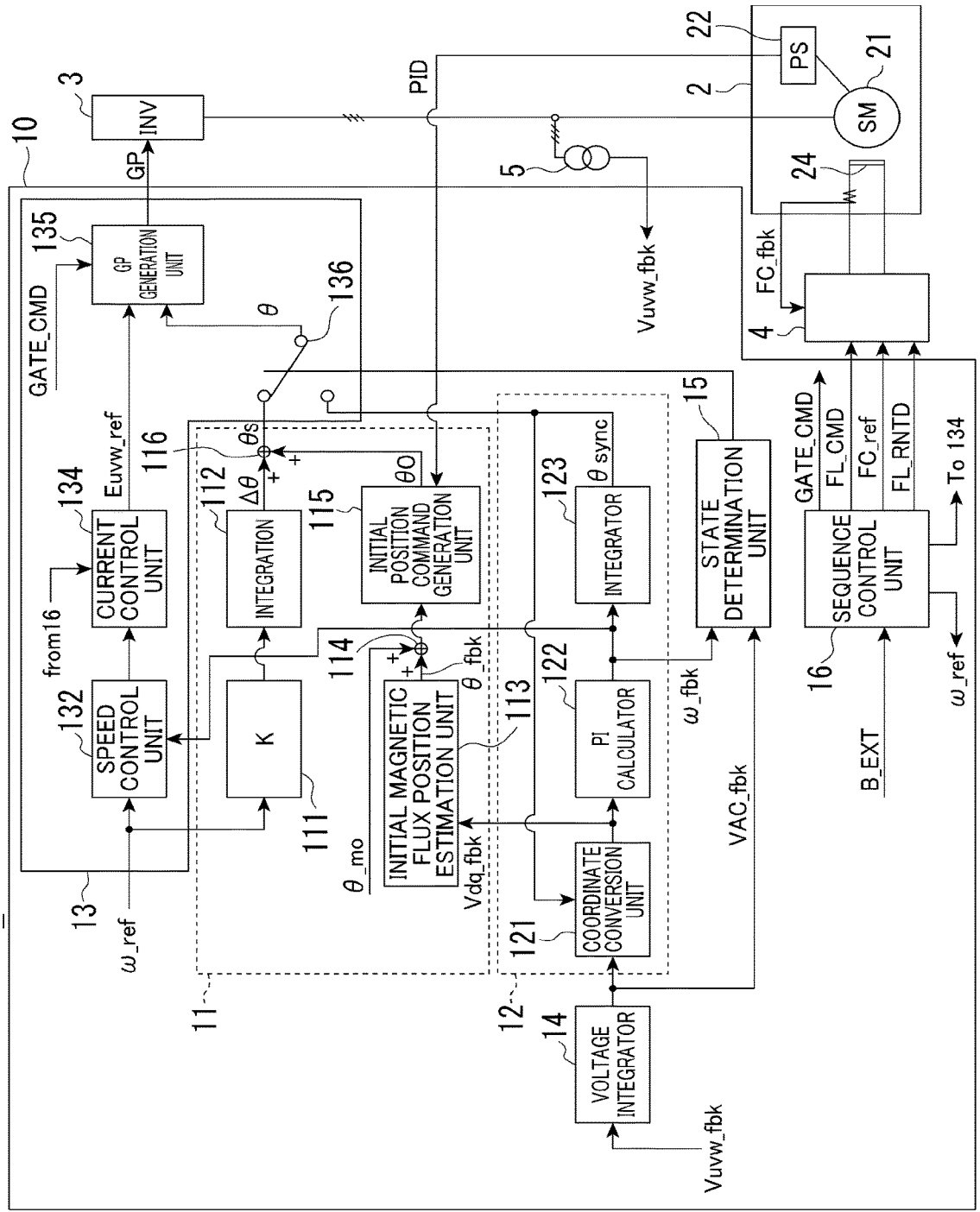
FIG. 1A is a configuration diagram of a drive system of an embodiment.

Hereinafter, a drive system and a control method of an embodiment will be described with reference to the drawings. In the following description, the same reference numerals will be given to the components having the same or similar functions and the overlapping descriptions of those components may be omitted. Additionally, the electrical connection may be simply referred to as "connected".

Figure 1B:
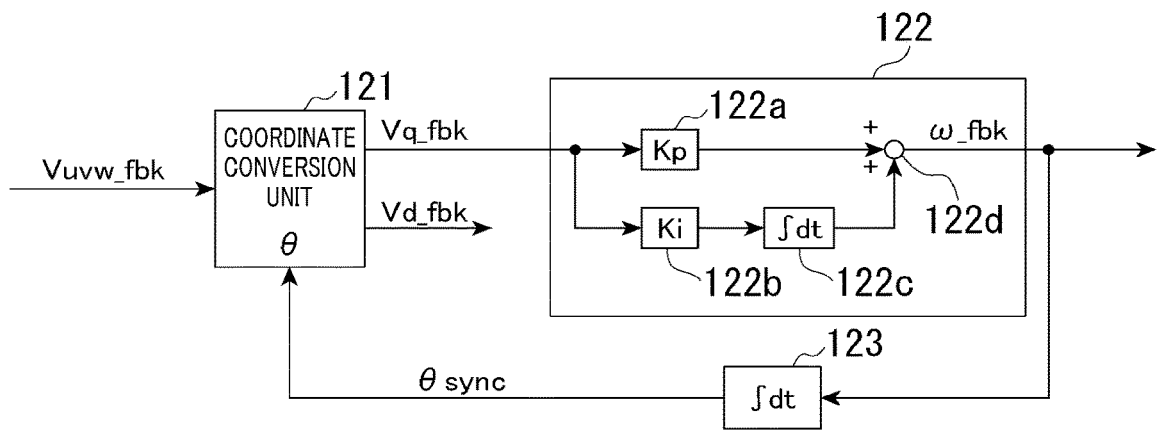
FIG. 1B is a configuration diagram of a second phase estimation unit of the embodiment.

FIG. 1A is a configuration diagram of a drive system 1 of the embodiment. FIG. 1B is a configuration diagram of a second phase estimation unit 12 inside a control unit 10 of the embodiment.

The drive system 1 includes, for example, a synchronous motor 2, an inverter 3, an exciter 4, an instrument transformer 5, and a control unit 10.

Figure 2:
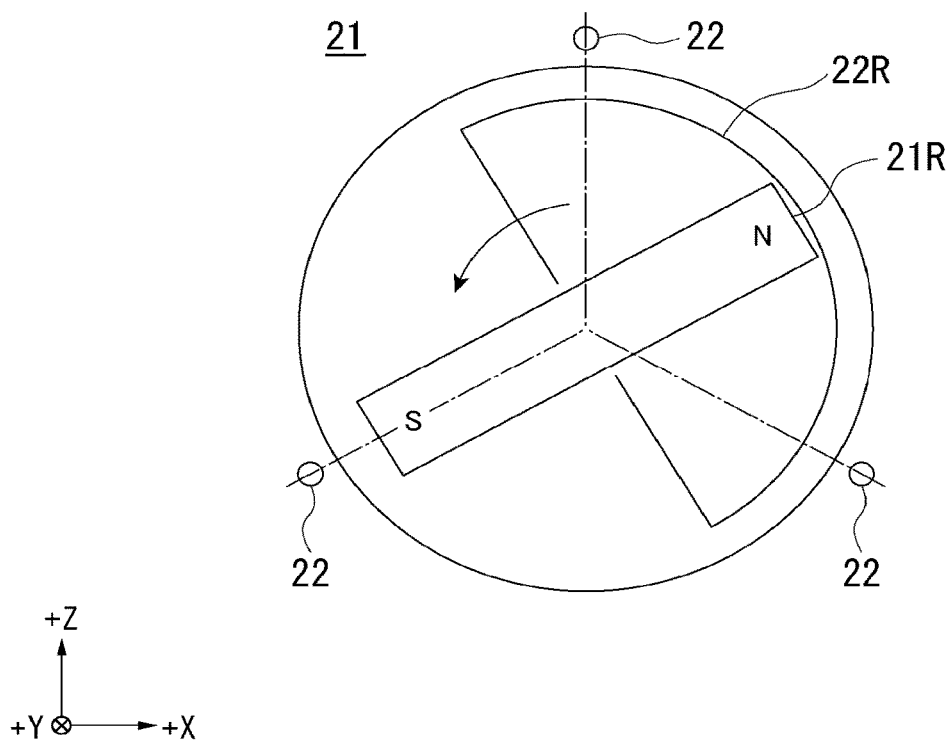
FIG. 2 is a schematic view showing the arrangement of a position detector of the embodiment.

The synchronous motor 2 includes a main body 21 and a position detector 22 (FIG. 2).

The synchronous motor 2 is, for example, an excitation type synchronous motor provided with a field winding 24.

A rotor 21R (FIG. 2), a stator winding (not shown), and a field winding 24 are provided inside the main body 21 of the synchronous motor 2. The synchronous motor 2 is driven by, for example, three-phase AC power of U, V, and W phases. The detailed description of the main body 21 of the synchronous motor 2 will be omitted, but an excitation type synchronous motor having a general structure may be adopted.

Figure 3A:
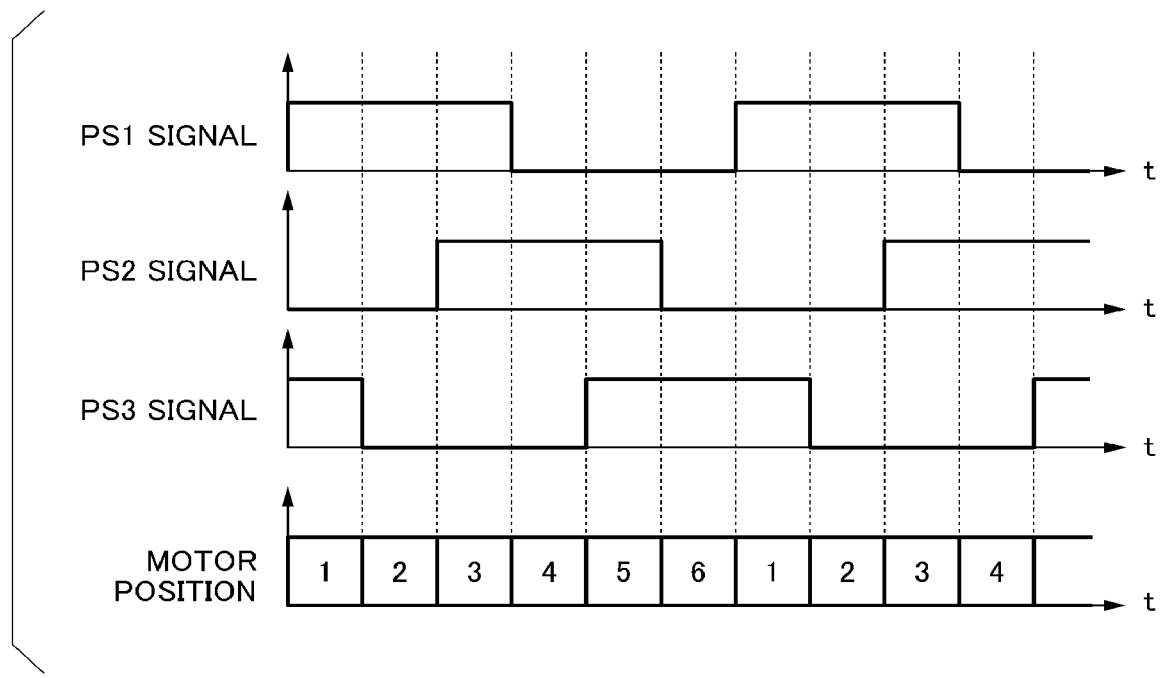
FIG. 3A is a diagram showing a relationship between an output signal of a position detector and a rotor phase used for position control of the embodiment.
Figure 3B:
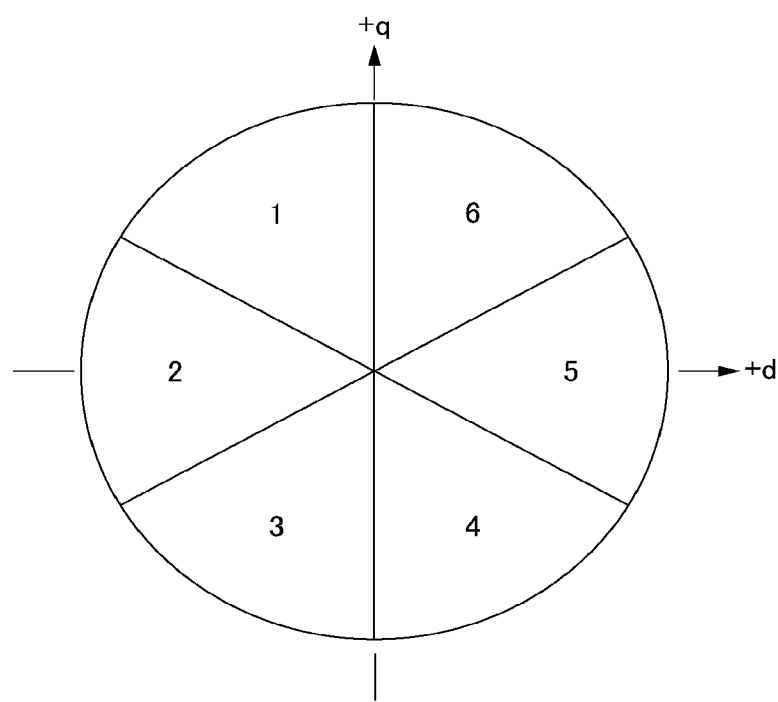
FIG. 3B is a diagram showing a rotor coordinate used for position control of the embodiment.

Referring to FIGS. 2 to 3B, the position detection of the rotor 21R of the embodiment will be described.

FIG. 2 is a schematic diagram showing the arrangement of the position detector 22 of the embodiment. FIG. 3A is a diagram showing a relationship between an output signal of the position detector 22 and a rotor phase used for position control of the embodiment. FIG. 3B is a diagram showing a rotor coordinate used for position control of the embodiment.

The schematic view shown in FIG. 2 shows the position of the position detector 22 when the position detector 22 is viewed from the axial direction.

A rotation body 22R for the position detector 22 rotating together with a shaft is provided in the shaft of the rotor 21R. The position detector 22 detects the position (referred to as the rotor position) of the rotor 21R by detecting the position of the rotation body 22R. Additionally, the detection accuracy of the position detector 22 may have an accuracy that can identify the angle region in which one lap is equally divided into numerical divisions.

For example, the position detector 22 is a proximal sensor switch (a proximity switch). The position detector 22 detects the rotor position with a resolution of 60° using a semicircular rotation body 22R and three proximity switches arranged to be shifted by 120° in the circumferential direction of the shaft. For example, the rotor positions are shown by the identification numbers from 1 to 6. The position detector 22 shows the detected rotor position as the position number using the values of 1 to 6 and outputs this position number as position information.

FIG. 3A shows a relationship between a detection result of the position detector 22 and a PS1 signal, a PS2 signal, and a PS3 signal respectively output from three proximity switches of the position detector 22 during rotation as a timing chart.

The PS1 signal, the PS2 signal, and the PS3 signal are two-value signals with a duty ratio of 50%. Depending on the arrangement positions of the proximity switches, the phases of the signals are shifted by 120°. The position detector 22 generates position information identified by, for example, the values of 1 to 6 by converting the combination of the logical values indicated by the PS1 signal, the PS2 signal, and the PS3 signal. In this way, the position detector 22 is formed in a lower resolution compared to the resolution of the position sensor such as a rotary encoder used for general position control. Additionally, the application of the rotary encoder having a relatively high resolution is not limited as the position detector 22. For example, when the signal detected by the relatively high-resolution rotary encoder is converted into a low-resolution signal, the rotary encoder can be treated in the same way as the position detector 22.

FIG. 3B shows the position of the detection result of the position detector 22 by using a rotor coordinate. The rotor coordinate has orthogonal d and q axes. Areas of 1 to 6 are divided in a counterclockwise from the direction of the +q axis.

Returning to FIG. 1A, the description of the drive system 1 is continued.

An inverter 3 is a power converter including multiple semiconductor switching elements. The inverter 3 converts DC power into three-phase AC power and supplies the AC power to the synchronous motor 2. The configuration of the inverter 3 is not limited and a general configuration may be adopted.

The exciter 4 supplies desired DC power to the field winding 24 of the synchronous motor 2.

In the instrument transformer 5, a primary winding is connected to an electric line of each phase connecting the inverter 3 and the synchronous motor 2 and a voltage according to the voltage of each phase is output to a secondary winding.

The control unit 10 includes a first phase estimation unit 11, a second phase estimation unit 12, a drive control unit 13, a voltage integrator (state estimation unit) 14, a state determination unit 15, and a sequence control unit 16.

Additionally, the control unit 10 includes, for example, a processor such as a CPU and may realize a part or all of function units such as the first phase estimation unit 11, the second phase estimation unit 12, the drive control unit 13, the voltage integrator 14, the state determination unit 15, and the sequence control unit 16 in such a manner that the processor executes a predetermined program. Alternatively, the above may be realized by the combination of electric circuits (circuitry). The control unit 10 may execute a transfer process of each data using a memory area of a storage unit provided therein and a calculation process for analysis by executing a predetermined program using a processor.

The sequence control unit 16 controls the following units at a predetermined timing to execute a desired operation. The details of the control will be described later.

The first phase estimation unit 11 generates a first phase θs obtained by estimating the phase of the rotor 21R on the basis of an initial phase in a rotor coordinate system corresponding to an actual rotor position at the startup stage of the synchronous motor 2. The first phase estimation unit 11 corrects the first phase by using the detection result of the rotor position detected from the start of the startup procedure of the synchronous motor 2 to the successful startup.

The second phase estimation unit 12 generates a second phase obtained by estimating the phase of the rotor 21R on the basis of the operation state of the synchronous motor 2. The state determination unit determines the operation state of the synchronous motor 2.

The drive control unit 13 controls the driving of the synchronous motor 2 by using any one of the first phase θs and the second phase according to the determination result of the operation state of the synchronous motor 2.

A voltage vector Vuvw_fbk is calculated on the basis of the detection value obtained by integrating the phase voltages of the synchronous motor 2 and the voltage integrator (state estimation unit) 14 and further a voltage value V_fbk^- abs of an index indicating the amplitude of the phase voltage is calculated.

The state determination unit 15 determines the operation state of the synchronous motor 2. For example, the state determination unit 15 may determine the operation state of the synchronous motor 2 on the basis of the voltage value V_fbk ^abs and the speed ω_fbk to be described later.

Hereinafter, more detailed configuration examples of the above units will be described.

As shown in FIG. 1B, the second phase estimation unit 12 includes, for example, a coordinate conversion unit 121, a PI calculator 122, and an integrator 123.

The coordinate conversion unit 121 calculates a field voltage feedback Vdq_fbk by using a second phase θsync on the basis of a field voltage feedback Vuvw_fbk generated by the voltage integrator 14. This calculation is, for example, a dq conversion that converts a three-phase signal into a two-phase signal of the rotor coordinate system.

The PI calculator 122 performs a proportional integral calculation of which characteristics are defined by a coefficient of a predetermined value on the basis of the value of the q-axis component (voltage Vq_fbk) of the field voltage feedback Vdq_fbk described above.

For example, the PI calculator 122 includes calculation blocks 122a, 122b, 122c, and 122d. The calculation block 122a performs a proportional calculation on the voltage Vq_fbk by using a coefficient Kp. The calculation block 122b performs a proportional calculation on the voltage Vq_fbk by using a coefficient Ki. Additionally, the coefficient Ki is used as a coefficient for integral calculation. The calculation block 122c performs an integral calculation on the product of the coefficient Ki and the voltage Vq_fbk which is the calculation result of the calculation block 122b. The calculation block 122d adds the proportional calculation result of the calculation block 122a and the integral calculation result of the calculation block 122c.

The integrator 123 integrates the proportional integration calculation result by the PI calculator 122 to generate the second phase θsync.

Accordingly, the second phase estimation unit 12 constitutes PLL by using the coordinate conversion unit 121, the PI calculator 122, and the integrator 123.

As shown in FIG. 1A, the first phase estimation unit 11 includes, for example, a proportional calculation unit 111, an integral calculation unit 112, an initial magnetic flux position estimation unit 113, an addition calculation unit 114, an initial position command generation unit 115, and an addition calculation unit 116.

The proportional calculation unit 111 performs a proportional calculation on a speed command ω_ref by using a coefficient K.

The integral calculation unit 112 (integration) integrates the proportional calculation result of the proportional calculation unit 111 to generate a phase Δθ. The phase Δθ corresponds to an angle in which the rotor 21R rotates after startup.

The initial magnetic flux position estimation unit 113 estimates an initial magnetic flux position θ_fbk on the basis of the field voltage feedback Vdq_fbk. The initial magnetic flux position estimation unit 113 calculates the initial magnetic flux position θ_fbk by using the following formula (1).

$$\theta\_fbk = \tan^{-1}(Vd\_fbk/Vq\_fbk) \quad (1)$$

The addition calculation unit 114 adds a phase offset value θ_mo to the initial magnetic flux position θ_fbk. The initial position command generation unit 115 generates an initial position command θ0 on the basis of the calculation result of the addition calculation unit 114. The addition calculation unit 116 generates the first phase θs by adding the phase Δθ generated by the integral calculation unit 112 to the initial position command θ0 generated by the initial position command generation unit 115. This first phase θs is used for the startup stage of the synchronous motor 2.

As described above, the first phase θs is estimated from the phase of the rotor 21R on the basis of the initial phase of the rotor coordinate system. The first phase estimation unit 11 corrects the first phase by using the detection result of the rotor position detected from the start of the startup procedure of the synchronous motor 2 to the successful startup. The start of the startup procedure of the synchronous motor 2 means, for example, starting to supply an excitation current to the field winding 24.

As shown in FIG. 1A, the drive control unit 13 includes, for example, a speed control unit 132, a current control unit 134, a GP control unit 135, and a switching unit 136.

The speed control unit 132 generates a current command in which an estimated speed ω_fbk matches the speed command ω_ref on the basis of the speed command ω_ref. The current control unit 134 generates a voltage command Euvw_ref in which an estimated current matches the current command on the basis of the current command. The GP control unit 135 generates a gate pulse on the basis of the voltage command Euvw_ref and the phase θ. For example, the GP control unit 135 uses the voltage command Euvw_ref as a coefficient and generates a sine wave of each phase of UVW by using a sine value of the phase θ. The GP control unit 135 generates a gate pulse of each phase by PWM-modulating the sine wave of each phase of the UVW using a triangular carrier signal. Additionally, the generation of the gate pulse of each phase using the GP control unit 135 is not limited to the above method, and a general method can be adopted instead.

The switching unit 136 selects any one of the first phase θs generated by the first phase estimation unit 11 and the second phase θsync generated by the second phase estimation unit 12 on the basis of the determination result of the state determination unit and outputs the selection result as the phase θ.

In this way, the drive control unit 13 controls the driving of the synchronous motor 2 by using any one of the first phase θs and the second phase according to the determination result of the operation state of the synchronous motor 2.

Next, initial magnetic pole position detection at startup of the embodiment will be described with reference to FIG. 4.

Figure 4:
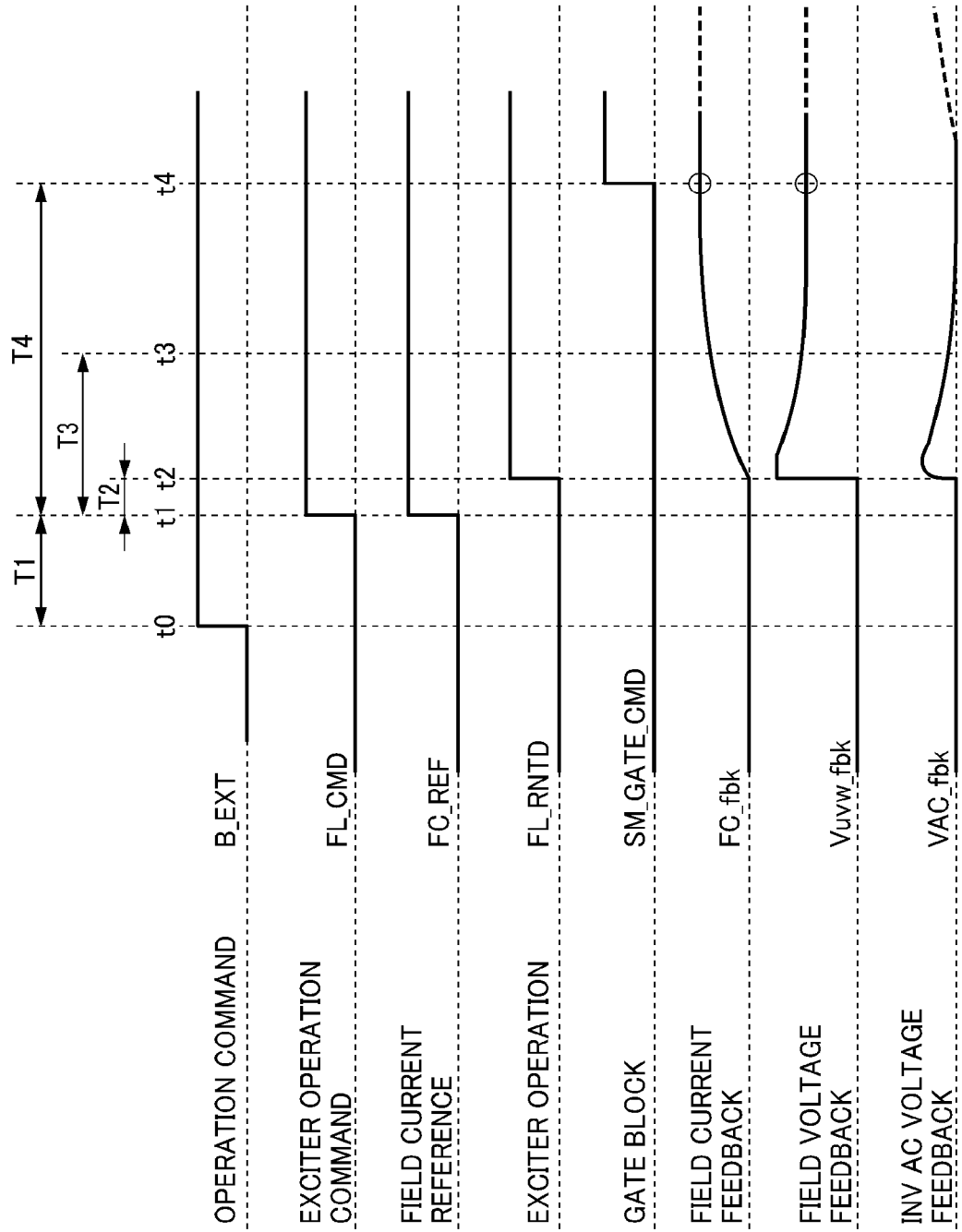
FIG. 4 is a timing chart relating to initial magnetic pole position detection at startup of the embodiment.

FIG. 4 is a timing chart relating to the initial magnetic pole position detection at startup of the embodiment.

In FIG. 4, signals of an operation command B_EXT, an exciter operation command FL_CMD, a field current reference FC_ref, an exciter operation FL_RNTD, a gate block GATE_CMD, a field current feedback FC_fbk, a field voltage feedback Vuvw_fbk, and an AC voltage feedback VAC_fbk are arranged in order from the upper side and a change in amplitude of each signal is shown.

The operation command B_EXT is the operation command of the drive system 1 supplied from an upper-level device.

The H level of this signal indicates the operation of the synchronous motor 2, and the L level of this signal indicates the stop thereof. For example, the transition of this signal from L level to H level indicates the start of operation (or startup).

When the H level indicating the start of the operation is supplied by the operation command B_EXT, the sequence control unit 16 generates a signal for starting the synchronous motor 2. The signals of the exciter operation command FL_CMD, the field current reference FC_ref, and the exciter operation FL_RNTD are examples of the signals for starting the synchronous motor 2. The exciter operation command FL_CMD activates the exciter 4 to enable the output of the excitation current. The field current reference FC_ref indicates a reference level that defines the magnitude of the field current. The exciter operation FL_RNTD is a signal for outputting an excitation current from the exciter 4 after the exciter 4 is activated.

The gate block GATE_CMD is a control signal for controlling the supply of the gate pulse with respect to the inverter 3. When this signal becomes H level, a gate pulse is supplied to the inverter 3, and when this signal becomes L level, the supply of the gate pulse to the inverter 3 is stopped. The sequence control unit 16 generates the exciter operation command FL_CMD, the field current reference FC_ref, the exciter operation FL_RNTD, and the gate block GATE_CMD and controls each unit inside the control unit by using these.

The field current feedback FC_fbk is the amplitude of the current indicated by the detection value of the current flowing through the field winding 24 detected by the transformer provided in the wiring connected to the field winding 24. The field voltage feedback Vuvw_fbk is the amplitude of the voltage indicated by the detection value of the voltage across both ends of the field winding 24. The AC voltage feedback VAC_fbk^abs (referred to as VAC_fbk) is a detection value of the three-phase AC voltage.

In the initial stage shown in FIG. 4, the synchronous motor 2 is stopped. The operation command B_EXT, the exciter operation command FL_CMD, the exciter operation FL_RNTD, and the gate block GATE_CMD are at the L level. The field current reference FC_ref, the field current feedback FC_fbk, the field voltage feedback Vuvw_fbk, and the AC voltage feedback VAC_fbk are all at the L level.

At the time to, the operation command B_EXT transitions to H level. The sequence control unit 16 detects this transition and starts the timer T1. The period of the timer T1 may be set in advance.

The timer T1 expires at the time t1. In response to this, the sequence control unit 16 outputs the exciter operation command FL_CMD at the H level, changes the field current reference FC_ref to a desired level in steps, and starts the timers T2 to T4. The period from the timers T2 to T4 may be set in advance. Additionally, the sequence control unit 16 maintains the output levels of other signals.

The timer T2 expires at the time t2. In response to this, the sequence control unit 16 outputs the exciter operation FL_RNTD at the H level. The exciter 4 detects this and starts the output of the voltage and the supply of the field current. The output voltage of the exciter 4 also rises at the same time. In response to this, the amplitudes of the field current feedback FC_fbk and the field voltage feedback Vuvw_fbk change. The voltage integrator 14 integrates the field voltage feedback Vuvw_fbk to generate the AC voltage feedback VAC_fbk.

The timer T3 expires at the time t3. The period of the timer T3 corresponds to the period for calculating the initial position. The coordinate conversion unit 121 calculates the field voltage feedback Vdq_tbk on the basis of the field voltage feedback Vuvw_fbk using the initial value of the second phase θsync. This calculation is, for example, a dq conversion that converts a so-called three-phase signal into a two-phase signal in the rotor coordinate system. The initial magnetic flux position estimation unit 113 uses the elements of the field voltage feedback Vdq_fbk to calculate the initial magnetic flux position θ_fbk according to the above-described formula (1).

The addition calculation unit 114 adds an initial magnetic flux position offset θ_mo and the initial magnetic flux position θ_fbk to calculate the initial position θ_0 according to the following formula (2).

$$\theta\_0 = \theta\_{mo} + \theta\_{fbk} \qquad (2)$$

The timer T4 expires at the time t4. The initial position command generation unit 115 compares the position number of the phase indicated by the initial position θ_0 of the calculation result of the addition calculation unit 114 with the position number detected by the position detector 22 and adjusts the initial position command θ0 by a predetermined method when the actual phase detected by the position detector 22 does not follow the initial position command θ0. This adjustment will be described later. When the startup of the synchronous motor 2 using the initial position command θ0 succeeds, the sequence control unit 16 sets the gate block GATE_CMD to H level and starts the supply of the AC power from the inverter 3 to the synchronous motor 2 in response to this.

Figures 5, 6:
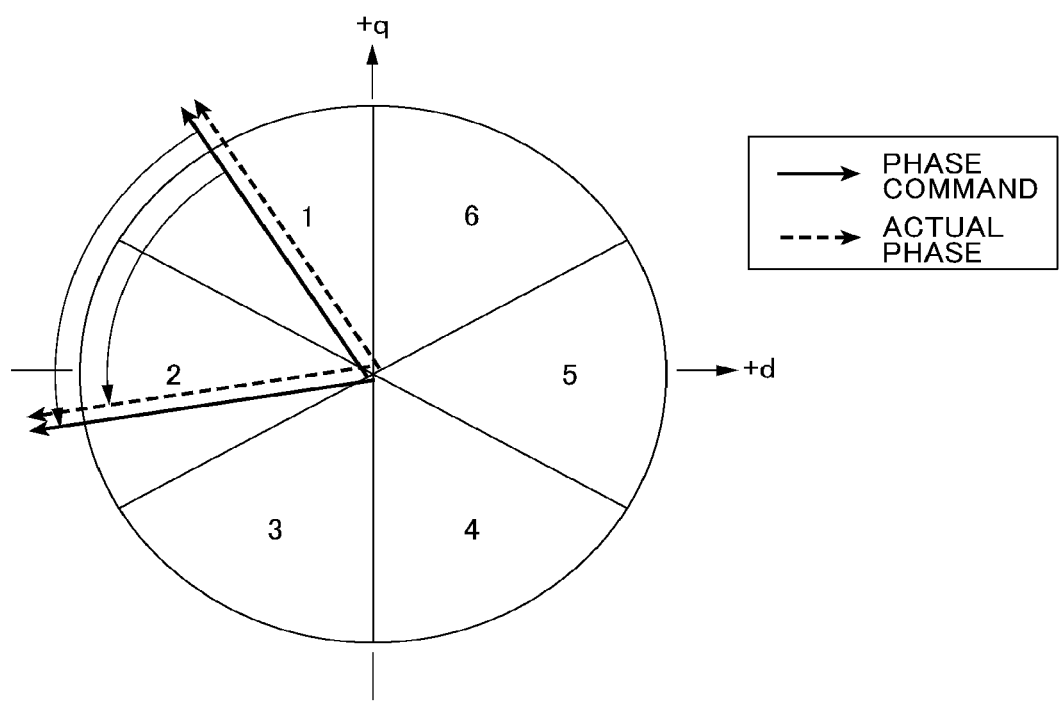
FIG. 5 is a diagram showing a relationship between a position and a position number output from a position detection unit of the embodiment.
FIG. 6 is a diagram showing a case where normal startup is performed in the embodiment.

Referring to FIG. 5, a relationship between the position and the position number output from the position detector 22 of the embodiment will be described. FIG. 5 is a diagram showing a relationship between the position and the position number output from the position detector 22 of the embodiment.

A relationship of six regions identified using identification information PID from P1 to P6, an angle range θP assigned to the regions, identification information PCID of a center position in the region, and an angle θPC of a center position is shown. For example, in a region in which the identification information PID is identified as P1, PC1 is the center position in the region in the identification information PCID. The position of PC1 is θPC1 and the angle range of the region P1 is within ±α centered on θPC1. Other regions P2 to P6 centered on PC2 to PC6 are the same as above.

Referring to FIGS. 6 to 10, an operation at startup of the embodiment will be described.

Figure 10:
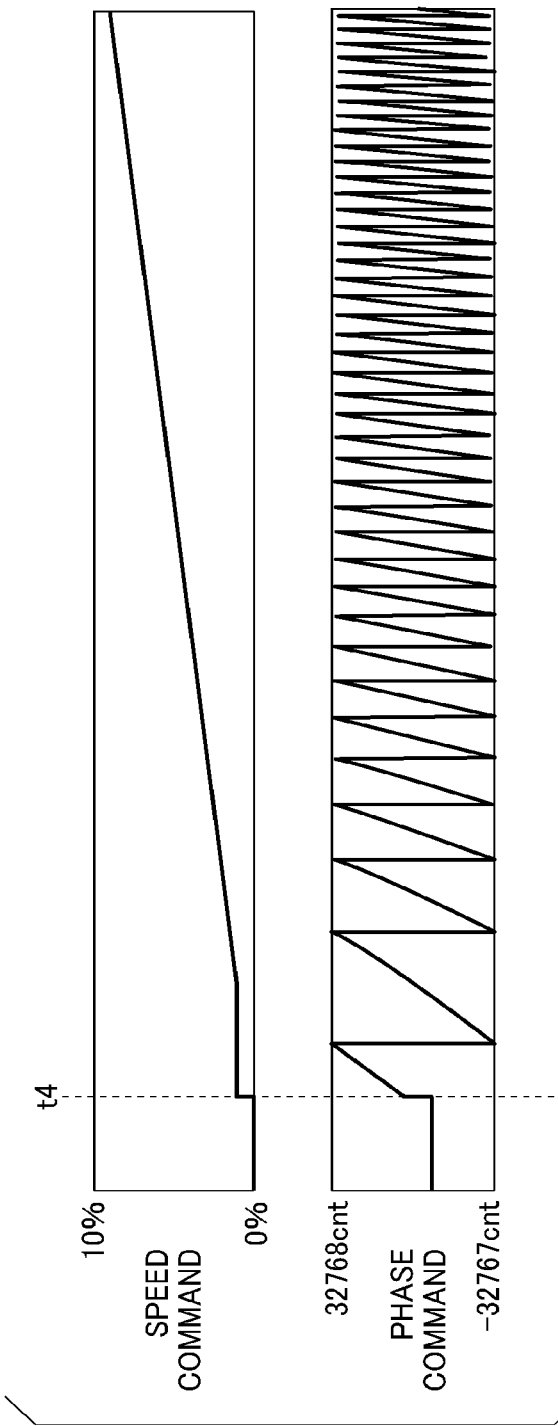
FIG. 10 is a diagram illustrating control after startup of a synchronous motor of the embodiment.

Case 1:

FIG. 6 is a diagram showing a case of normal startup of the embodiment. An example shown in FIG. 6 shows a case of normal startup. FIG. 10 is a diagram illustrating control after startup of the synchronous motor 2 of the embodiment.

If there is no problem in estimating the initial magnetic pole position and a sufficient current for the required starting torque can be supplied, the motor rotates at a desired speed on the basis of the phase command.

Additionally, as shown in FIG. 10, after the synchronous motor 2 is started, the control unit 10 switches the switching unit 136 after the time t4 and uses the phase command θ based on the second phase θsync to accelerate the synchronous motor 2 using the speed command ω_ref determined so as not to cause step-out. Based on the phase command θ shown in FIG. 10, a gate pulse for each phase of the U, V, and W phases is generated by a general voltage-type inverter. In each case described below, the description is the same after the synchronous motor 2 is started.

Figure 7:
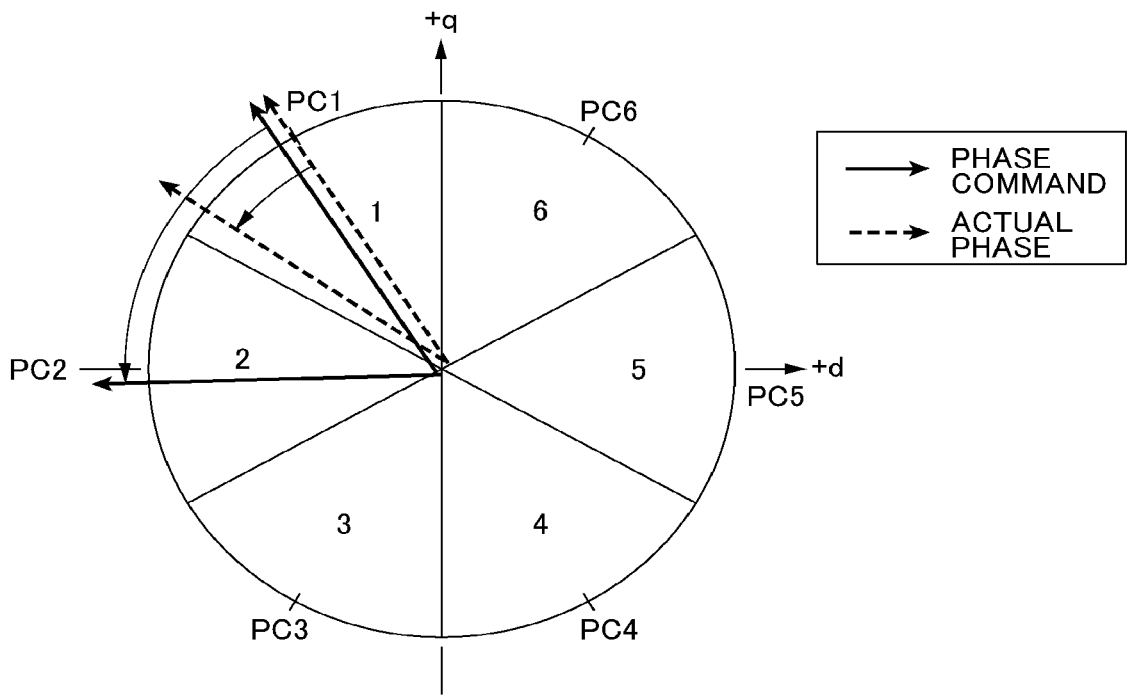
FIG. 7 is a diagram showing a case where normal startup is not performed in the embodiment.
Figure 8:
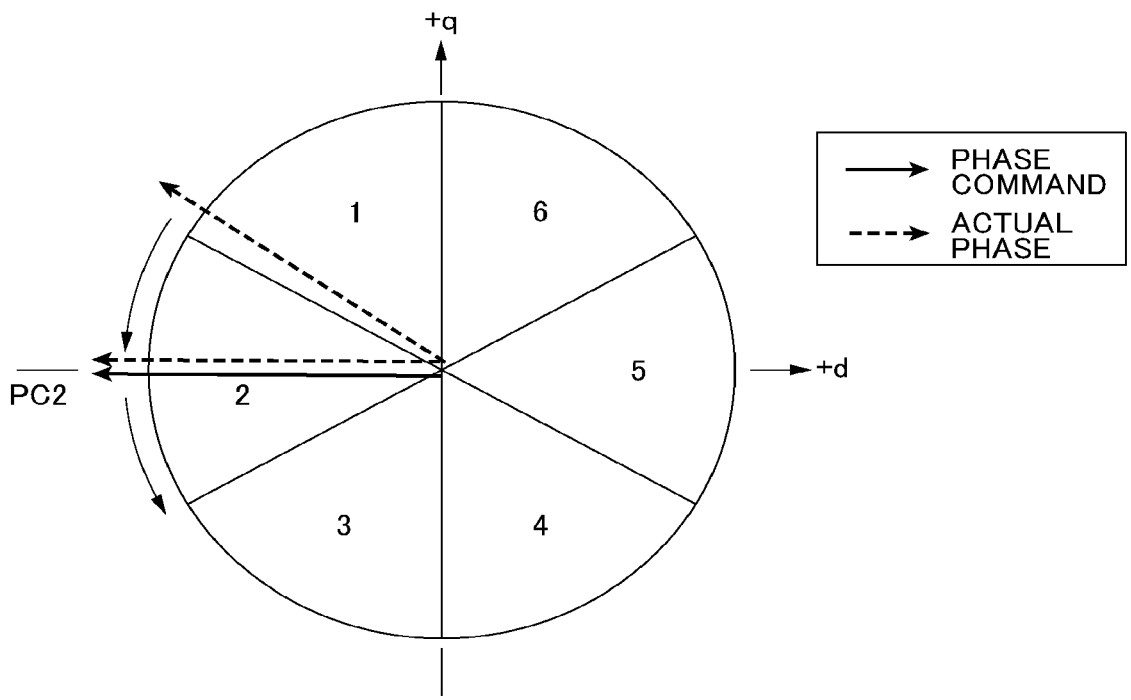
FIG. 8 is a diagram showing a first case of correcting an operation state from a state shown in FIG. 7.
Figure 9:
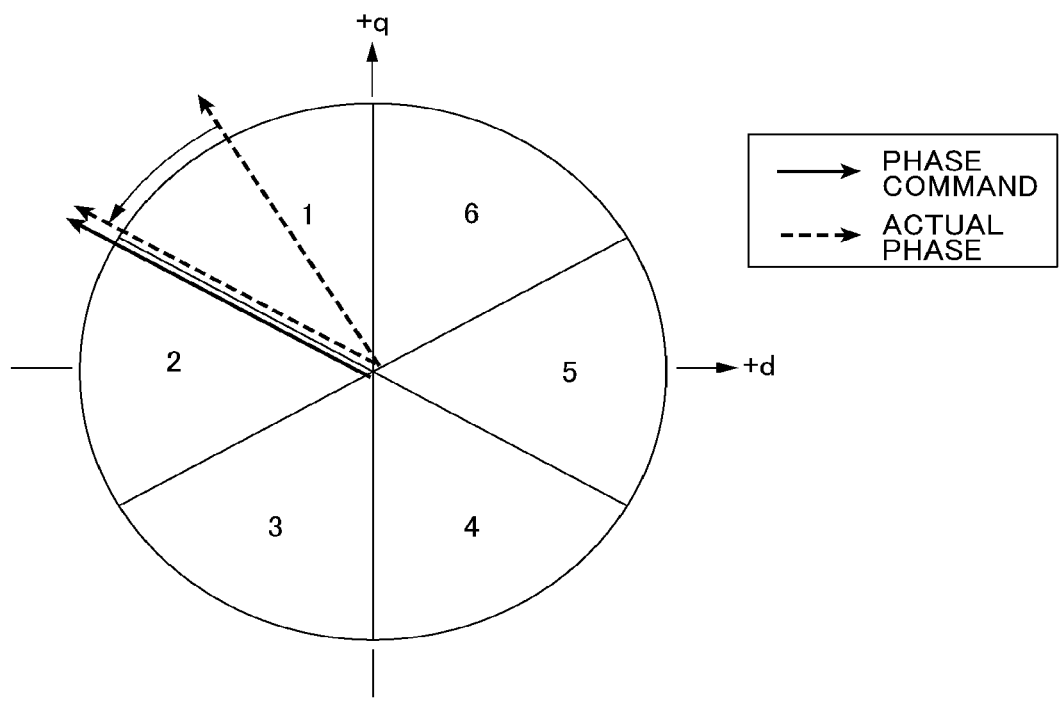
FIG. 9 is a diagram showing a second case of correcting an operation state from a state shown in FIGS. 7 and 8.

Case 2:

Referring to FIGS. 7 to 9, a case where normal startup is not performed in the embodiment will be described.

FIG. 7 is a diagram showing a case where normal startup is not performed in the embodiment. FIG. 8 is a diagram showing a first case of correcting the operation state from the state shown in FIG. 7. FIG. 9 is a diagram showing a second case of correcting the operation state from the state shown in FIGS. 7 and 8.

For example, a case in which the initial magnetic pole detection is incorrect at the startup stage is a typical example of the above.

As shown in FIG. 7, the position number estimated by the initial magnetic pole position detection and the actual position number may be different from each other before startup of the synchronous motor 2. In such a case, it can be determined that the initial magnetic pole position detection is incorrect. In this case, the initial phase is corrected to be at the boundary between the actual position number and the next thereof and the phase rotation is started from that position.

For example, when the acceleration rate of the speed command ω_ref generated by the sequence control unit 16 is too high, the motor may not follow the phase command and may stall (step out). Such an event occurs in a case where the acceleration rate is too higher than the inertia of the synchronous motor 2 when the sequence control unit 16 increases the speed of the synchronous motor 2 while increasing the speed command ω_ref.

The control unit 10 can detect the occurrence of such an event by the following method.

As shown in FIG. 7, when the phase command θ reaches the center (for example, PC2) of each position in the corresponding angle region, the initial position command generation unit 115 identifies whether or not the position number of the phase of the actual rotor 21R matches the position number of the phase command θ. When the identification result matches, the initial position command generation unit 115 determines that the actual phase of the rotor 21R follows the phase command θ and continues the control. On the other hand, as shown in FIG. 7, when the identification result does not match, the initial position command generation unit 115 temporarily stops the phase command θ at that position (for example, PC2) and waits until the position of the phase command θ matches the position number corresponding to the actual phase of the rotor 21R.

The adjustment of the phase command θ accompanying the waiting may be performed in such a manner that the initial position command generation unit 115 gives an offset to the phase θ0. Instead of this, the integral calculation unit 112 may directly change the value of the phase Δθ which is the output value according to the instruction of the initial position command generation unit 115.

By adjusting the phase command θ as described above, in a case in which the position number matches until a predetermined time elapses from this adjustment, it can be determined that the acceleration rate is slightly higher than the inertia of the rotation body including the rotor 21R although the synchronous motor 2 is rotating. In this case, the sequence control unit 16 lowers the acceleration rate of the speed command ω_ref by a predetermined amount to continue the subsequent phase rotation.

On the other hand, in a case in which the position number does not match even when a predetermined time elapses from the adjustment of the phase command θ, it can be determined that the acceleration rate of the speed command ω_ref is too high or the current supplied to the synchronous motor 2 is insufficient for the required starting torque. In this case, the initial position command generation unit 115 returns the phase command θ to the boundary phase between the position numbers PC1 and PC2, increases the armature or field current at a predetermined ratio (k times), and resumes the rotation of the phase command θ. Additionally, the predetermined ratio (k times) may be determined according to the rated capacities and overload capacity of the synchronous motor 2 and the inverter 3. In a case in which the actual position number has transitioned to the position of the desired position number at the time of the subsequent phase determination, it can be determined as successful startup. In this case, the initial position command generation unit 115 returns the armature or field current to the original value before the increase.

In a case where the position numbers do not match even after each of the above-described measures is taken, the initial position command generation unit 115 identifies that the startup has failed and stops the driving of the synchronous motor 2.

According to the above-described embodiment, the first phase estimation unit 11 of the drive system 1 corrects the first phase θs relating to the phase command θ of the synchronous motor 2 by using the detection result of the rotor position detected from the start of the startup procedure of the synchronous motor 2 to the successful startup. Accordingly, the drive system 1 can start the synchronous motor 2 without stalling.

For example, the first phase estimation unit 11 may calculate the first phase θs on the basis of the initial phase θ and the integration result of the speed command ω_ref of the synchronous motor 2 from the start of the startup procedure of the synchronous motor 2.

The first phase estimation unit 11 may correct the value of the first phase θs by using the detection result of the rotor position (the value of the position) detected by the position detector 22 after a predetermined time elapses from the start of the startup procedure of the synchronous motor 2 by excitation of the synchronous motor 2.

The first phase estimation unit 11 may correct the value of the first phase θs when the phase with respect to the actual rotor position is detected as being slower than the first phase θs from the detection result of the rotor position detected from the start of the startup procedure of the synchronous motor 2 to the successful startup.

The first phase estimation unit 11 may correct the value of the first phase θs in a delay direction by decreasing the value of the first phase θs using a correction value of the first phase θs when the phase with respect to the actual rotor position is detected as being slower than the first phase θs.

The first phase estimation unit 11 may correct a control amount for driving the synchronous motor 2 after detection to a value lower than a control amount for driving the synchronous motor 2 before detection when the phase with respect to the actual rotor position is detected as being slower than the first phase θs. Additionally, the speed command ω_ref is an example of the above control amount.

The second phase estimation unit 12 generates the second phase by estimation on the basis of the operation state of the synchronous motor while the startup procedure of the synchronous motor 2 is performed by using the first phase θs calculated by the first phase estimation unit 11. In this way, since the generation of the second phase of the second phase estimation unit 12 can be started while the startup procedure of the synchronous motor 2 is performed by using the first phase θs, it is possible to enhance control stability when the control using the phase command θ based on the first phase θs is switched to the control using the phase command θ based on the second phase θsync.

According to such a drive system 1, the position detector 22 can be used as an auxiliary in the startup stage even when the synchronous motor 2 is driven by sensorless control. For example, the magnetic pole position at the time of stop is unknown, and there is a very low speed region where the amplitude of the induced voltage is small and speed estimation is difficult. Under such conditions, it was difficult to determine whether the actual phase follows the phase command.

In response to such an event, the drive system 1 can control the synchronous motor 2 without stalling (stepping out) at startup.

Modified Example

Figure 11:
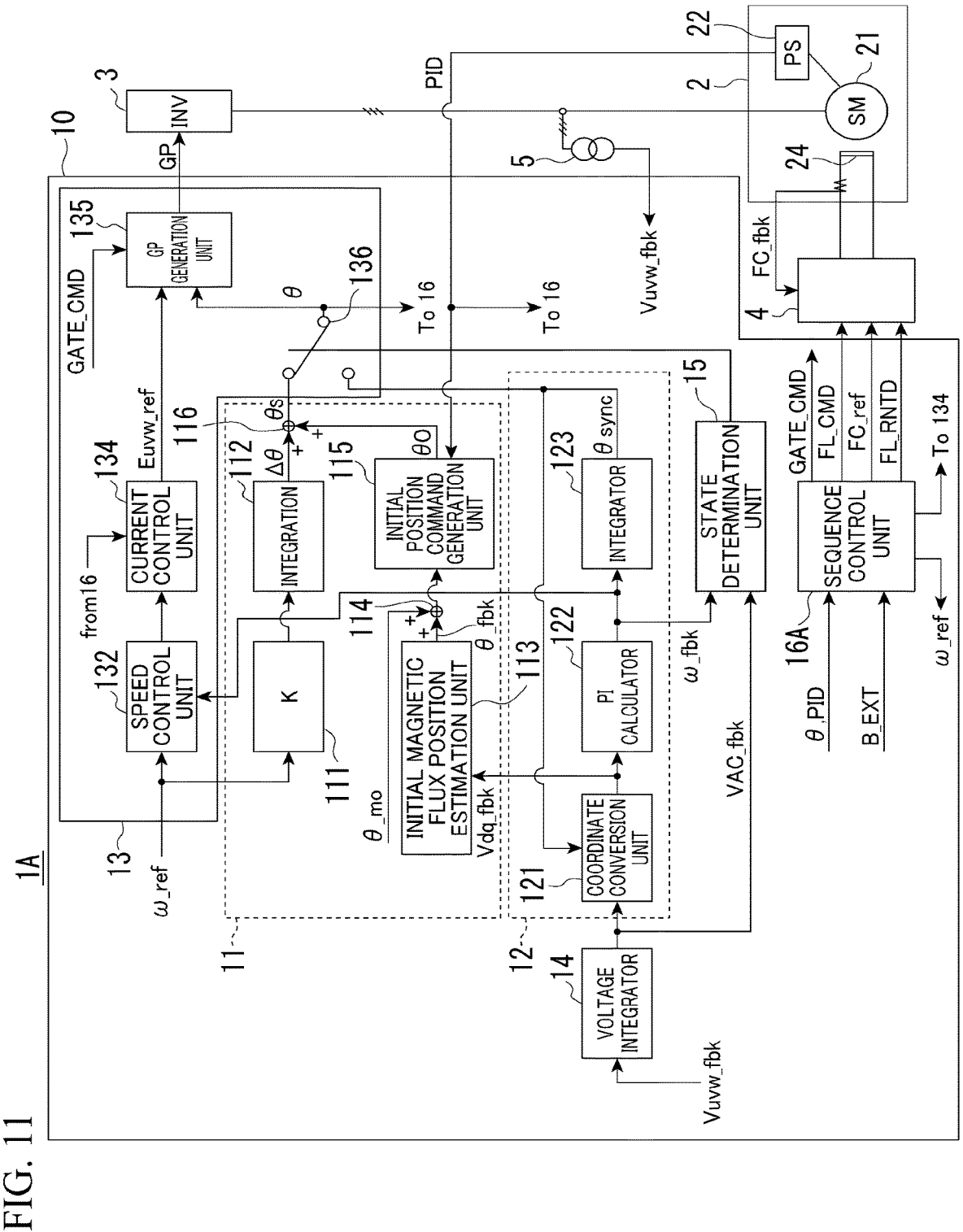
FIG. 11 is a configuration diagram of a drive system of a modified example.
Figure 12:
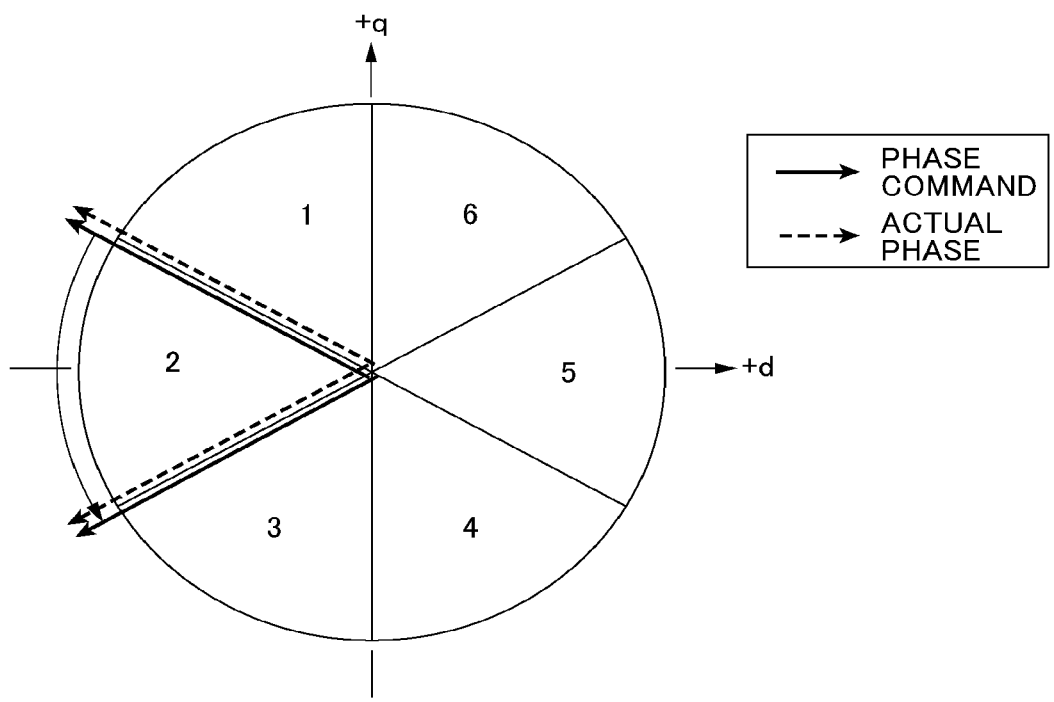
FIG. 12 is a diagram illustrating control at startup of the drive system of the modified example.

Referring to FIGS. 11 and 12, a modified example of the embodiment will be described.

FIG. 11 is a configuration diagram of a drive system 1A of the modified example. FIG. 12 is a diagram illustrating control at startup of the drive system 1A of the modified example.

In the above-described embodiment, the drive system 1 that starts the synchronous motor 2 without stalling has been described. In this modified example, the drive system 1A that starts the synchronous motor 2 more quickly will be described.

In the case of a comparative example, at extremely low speeds until the induced voltage sufficient to estimate the speed based on the induced voltage of the synchronous motor is obtained, the speed command ω_ref is increased sufficiently slowly so that the synchronous motor does not step out. Therefore, the change amount (speed rate) of the speed command ω_ref is decreased more than necessary, and the startup time may be delayed.

Here, the control unit 10 of the drive system 1A of the modified example includes a sequence control unit 16A instead of the sequence control unit 16 of the drive system 1. The sequence control unit 16A is different from the sequence control unit 16 in the following points.

The sequence control unit 16A acquires the position number of the actual phase from the position detector 22 and the position θs from the first phase estimation unit 11. The sequence control unit 16A may acquire the phase command θ from the drive control unit 13 instead of the position θs. When this modified example is applied, the position θs is selected as the phase command θ. The following description shows a case of using the phase command θ.

The sequence control unit 16A measures a time Δt1 during which one position number of the actual phase changes and a time Δt2 during which one position number of the phase command θ changes. For example, the sequence control unit 16A derives the product of the time Δt1 and the speed command ω_ref and derives the product of the time Δt2 and the speed command ω_ref. When the difference in the above products is below a certain level, it can be determined as being in a situation of follow. In this case, the sequence control unit 16A increases the speed rate for the next phase rotation according to a predetermined increase amount. Additionally, the predetermined increase amount is set to gradually increase the speed command ω_ref so that the synchronous motor 2 does not step out. By repeating this, it is possible to provide the drive system 1A that starts the synchronous motor 2 using an acceleration rate increased within a range that does not cause step-out in terms of the sequence control unit 16A.

According to at least one of the above-described embodiments, a drive system includes a first phase estimation unit, a second phase estimation unit, a state determination unit, and a drive control unit. The first phase estimation unit generates a first phase obtained by estimating a phase of a rotor on the basis of an initial phase at a startup stage of the synchronous motor. The second phase estimation unit generates a second phase obtained by estimating the phase of the rotating rotor on the basis of the operation state of the synchronous motor. The state determination unit determines the operation state of the synchronous motor. The drive control unit controls the driving of the synchronous motor by using any one of the first phase and the second phase according to the determination result of the operation state of the synchronous motor. The first phase estimation unit corrects the first phase by using the detection result of the rotor position detected from the start of the startup procedure of the synchronous motor to the successful startup. Accordingly, it is possible to start the motor without stalling.

Although some embodiments of the present invention have been described, these embodiments are presented as examples and are not intended to limit the scope of the invention. These embodiments can be implemented in various other forms, and can be omitted, replaced, and changed in various ways that do not deviate from the invention. These embodiments and their modifications are also included in the invention described in the claims and the equivalent range thereof, as included in the scope of the invention and the essentials.

REFERENCE SIGNS LIST

1 Drive system
2 Synchronous motor
3 Inverter
4 Exciter
10 Control unit
11 First phase estimation unit
12 Second phase estimation unit
13 Drive control unit
14 Voltage integrator (state estimation unit)
15 State determination unit
16 Sequence control unit
22 Position detector

The invention claimed is:

1. A drive system comprising:
a first phase estimation unit that generates a first phase obtained by estimating a phase of a rotor on the basis of an initial phase at a startup stage of a synchronous motor;
a second phase estimation unit that generates a second phase obtained by estimating the phase of the rotating rotor on the basis of an operation state of the synchronous motor;
a state determination unit that determines the operation state of the synchronous motor; and
a drive control unit that controls the driving of the synchronous motor by using any one of the first phase and the second phase according to a determination result of the operation state of the synchronous motor,
wherein the first phase estimation unit corrects the first phase by using a detection result of a rotor position detected from a start of a startup procedure of the synchronous motor to successful startup.

2. The drive system according to claim 1,
wherein the first phase estimation unit calculates the first phase on the basis of the initial phase and an integration result of a speed command of the synchronous motor from the start of the startup procedure of the synchronous motor.

3. The drive system according to claim 1,
wherein the synchronous motor is an excitation type synchronous motor, and
wherein the first phase estimation unit corrects the first phase by using a detection result of the rotor position detected by a position detector after a predetermined time elapses from the start of the startup procedure of the synchronous motor by excitation of the synchronous motor.

4. The drive system according to claim 3,
wherein the first phase estimation unit corrects a value of the first phase when a phase with respect to an actual rotor position is detected as being slower than the first phase from the detection result of the rotor position detected from the start of the startup procedure of the synchronous motor to the successful startup.

5. The drive system according to claim 4,
wherein the first phase estimation unit corrects a value of the first phase in a delay direction by decreasing a value of the first phase using a correction value of the first phase when the phase with respect to the actual rotor position is detected as being slower than the first phase.

6. The drive system according to claim 5,
wherein the first phase estimation unit corrects a control amount for driving the synchronous motor after detection to a value reduced than a control amount for driving the synchronous motor before detection when the phase with respect to the actual rotor position is detected as being slower than the first phase.

7. The drive system according to claim 1,
wherein the second phase estimation unit generates the second phase obtained by estimation on the basis of the operation state of the synchronous motor while the startup procedure of the synchronous motor is performed by using the first phase calculated by the first phase estimation unit.

8. A control method comprising the steps of:
generating a first phase obtained by estimating a phase of a rotor on the basis of an initial phase at a startup stage of a synchronous motor;

generating a second phase obtained by estimating the phase of the rotating rotor on the basis of an operation state of the synchronous motor;

determining the operation state of the synchronous motor;

controlling the driving of the synchronous motor by using any one of the first phase and the second phase according to the determination result of the operation state of the synchronous motor; and correcting the first phase by using a detection result of a rotor position detected from a start of a startup procedure of the synchronous motor to successful startup.

\* \* \* \* \*